(12) United States Patent
Ide et al.

(10) Patent No.: US 10,241,336 B2
(45) Date of Patent: Mar. 26, 2019

(54) RETINAL SCANNING DISPLAY DEVICE AND BEAM WIDTH EXPANDER

(71) Applicant: SEIKO EPSON CORPORATION, Tokyo (JP)

(72) Inventors: Mitsutaka Ide, Suwa (JP); Masatoshi Yonekubo, Hara-mura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 9 days.

(21) Appl. No.: 15/696,633

(22) Filed: Sep. 6, 2017

(65) Prior Publication Data

US 2018/0088341 A1 Mar. 29, 2018

(30) Foreign Application Priority Data

Sep. 26, 2016 (JP) ................. 2016-186605

(51) Int. Cl.
*G02B 27/09* (2006.01)
*G02B 26/08* (2006.01)
*G02B 26/10* (2006.01)
*G02B 27/01* (2006.01)

(52) U.S. Cl.
CPC ..... *G02B 27/0977* (2013.01); *G02B 26/0833* (2013.01); *G02B 26/101* (2013.01); *G02B 26/105* (2013.01); *G02B 27/0172* (2013.01); *G02B 27/0176* (2013.01); *G02B 2027/0178* (2013.01)

(58) Field of Classification Search
CPC .............. G02B 27/0977; G02B 26/105; G02B 27/0172; G02B 27/0176; G02B 26/101; G02B 26/0833; G02B 2027/0178

USPC .......... 359/13, 15, 17, 34, 629, 618
See application file for complete search history.

(56) References Cited

U.S. PATENT DOCUMENTS

| | | | |
|---|---|---|---|
| 8,913,324 B2* | 12/2014 | Schrader | G02B 27/0172 359/630 |
| 2007/0171328 A1 | 7/2007 | Freeman et al. | |
| 2015/0277124 A1 | 10/2015 | Ide et al. | |
| 2015/0279114 A1 | 10/2015 | Yonekubo | |
| 2016/0124226 A1 | 5/2016 | Ide et al. | |
| 2016/0124232 A1 | 5/2016 | Ide et al. | |

FOREIGN PATENT DOCUMENTS

| | | |
|---|---|---|
| JP | 5226528 B2 | 7/2013 |
| JP | 2015-191026 A | 11/2015 |
| JP | 2015-191103 A | 11/2015 |

(Continued)

*Primary Examiner* — Tuyen Tra
(74) *Attorney, Agent, or Firm* — Oliff PLC

(57) ABSTRACT

In a retinal scanning display device, a scanning section scans a light beam emitted from a light source to form a scanned image. The light beam emitted from the scanning section is expanded in beam width of the light beam in a first direction by a first beam width expander. The first beam width expander includes alternately stacked first partially reflective layers and first light-transmissive layers disposed between a pair of first reflection faces that face each other in the first direction. The plural partially reflective layers include a partially reflective layer having a transmittance exceeding 50%. This enables the light intensity distribution to be appropriately adjusted in the first direction for a light beam expanded in the first direction.

13 Claims, 14 Drawing Sheets

(56) References Cited

FOREIGN PATENT DOCUMENTS

| | | |
|---|---|---|
| JP | 2016-090801 A | 5/2016 |
| JP | 2016-090802 A | 5/2016 |
| JP | 2016-166930 A | 9/2016 |
| JP | 2016-186605 A | 10/2016 |
| WO | 2007/062098 A2 | 5/2007 |
| WO | 2016-143246 A1 | 9/2016 |

* cited by examiner

| A | B | C |
|---|---|---|
| 0.250 | 0.250 | 0.250 |

L0' (−10°)

| A' | B' | C' |
|---|---|---|
| 0.188 | 0.250 | 0.281 |

| P1 | A/A' | 133.3% |
|---|---|---|
| P2 | (A+B)/(A'+B') | 114.3% |
| P3 | (A+B+C)/(A'+B'+C') | 104.3% |
| P4 | (B+C)/(B'+C') | 94.1% |
| P5 | C/C' | 88.9% |

| A | B | C |
|---|---|---|
| 0.248 | 0.227 | 0.303 |

L0' (−10°)

| A' | B' | C' |
|---|---|---|
| 0.208 | 0.255 | 0.271 |

| P1 | A/A' | 119.1% |
|---|---|---|
| P2 | (A+B)/(A'+B') | 102.5% |
| P3 | (A+B+C)/(A'+B'+C') | 105.9% |
| P4 | (B+C)/(B'+C') | 100.7% |
| P5 | C/C' | 111.7% |

FIG. 13

| L0 (+10°) | | |
|---|---|---|
| A | B | C |
| 0.315 | 0.29875 | 0.325 |

| L0' (−10°) | | |
|---|---|---|
| A' | B' | C' |
| 0.237 | 0.255 | 0.254 |

| P1 | A/A' | 133.0% |
|---|---|---|
| P2 | (A+B)/(A'+B') | 124.7% |
| P3 | (A+B+C)/(A'+B'+C') | 125.8% |
| P4 | (B+C)/(B'+C') | 122.5% |
| P5 | C/C' | 128.0% |

RETINAL SCANNING DISPLAY DEVICE AND BEAM WIDTH EXPANDER

BACKGROUND

1. Technical Field

The present disclosure relates to a retinal scanning display device including a beam width expander, and to a beam width expander of the same.

2. Related Art

Retinal scanning display devices to cause a light beam of modulated light to be incident on an eye of a user include a light source that emits a light beam, a scanning section to scan the light beam emitted from the light source to form a scanned image, and an optical system to cause the light beam emitted from the scanning section to be incident on the eye of the user. In a retinal scanning display device configured in this manner, if the beam width of the light beam is small, then occluded portions in images and the like appear due to the light beam not entering the pupil when the position of the pupil has changed. Thus in retinal scanning type display devices, there is accordingly technology proposed in which a beam width expander is provided between a scanning section and an optical system to expand the beam width of the light beam emitted from the scanning section (see JP-A-2016-90802). In JP-A-2016-90802, as schematically illustrated in FIG. 5, a beam width expander 10 is employed having alternately stacked partially reflective layers 11 and light-transmissive layers 12 disposed between a pair of reflection faces 13, 14.

In the retinal scanning display device described in JP-A-2016-90802, as illustrated in FIG. 5, an emission angle from an emission face 17 of the beam width expander 10 is changed by changing the incident angle of a light beam L to an incident face 16 of the beam width expander 10 while scanning with the scanning section. Thus, as illustrated in FIG. 6, the light beam L is made incident on the eye E from a different angular direction so as to cause a user to see an image. In FIG. 5 and FIG. 6, a light beam L incident to the incident face 16 perpendicularly is illustrated with a solid line, a light beam L0 angled at +10° with respect to the perpendicular light beam L is illustrated with a single-dot dashed line, and a light beam L0' angled at −10° with respect to the perpendicular light beam L is illustrated with a double-dot dashed line.

In such a retinal scanning display device, if the eyeball E0 moves, then the portion of the light beam L blocked by an iris E2 changes depending on the direction the light beam is incident to the pupil, changing the amount of light reaching a retina E3. In FIG. 6, the light beam L0 is illustrated by three light rays of intensities A, B, C, and the light beam L0' is illustrated by three light rays of intensities A', B', C'. As is apparent from FIG. 6, when the eyeball E0 is facing forward, the light rays of intensities A, B, C in the light beam L0 reach the retina E3, and the light rays of intensities A', B', C' in the light beam L0' reach the retina E3. However, when the eyeball E0 moves so as to rotate in one direction CW, the light rays of intensities A, B, C in the light beam L0 reach the retina E3 and the light rays of intensities A', B' in the light beam L0' reach the retina E3. However, when the eyeball E0 moves so as to rotate in another direction CCW, the light rays of intensities B, C in the light beam L0 reach the retina E3 and the light rays of intensities B', C' in the light beam L0' reach the retina E3. When the following Equation (1) holds, the intensities of the light beams L0, L0' reaching the retina E3 are the same as each other when the eyeball E0 has moved in the one direction CW to when the eyeball E0 has moved in the other direction CCW, and so uneven brightness is not generated in an image.

$$A \approx A', B \approx B', C \approx C' \quad (1)$$

However, in the beam width expander 10, due to the difference in the progression paths of the light beam L within the beam width expander 10, the light beams L0, L0' each have a light intensity distribution along a beam width expansion direction, and the light intensity distributions are different for the light beam L0 and the light beam L0'. For example, the light intensities of the light beams L0, L0' are given by the following Equations (2) and the intensities of the light beams L0, L0' reaching the retina E3 are different when the eyeball E0 has moved in the one direction CW to when the eyeball E0 has moved in the other direction CCW. When such a situation arises, the image seen by the user has a different brightness in a region corresponding to the light beam L0 to the brightness in a region corresponding to the light beam L0'.

$$A > A', B = B', C < C' \quad (2)$$

When the light intensity distribution represented by Equation (2) arises, uneven brightness stands out due to the relative magnitude of the brightness in the region corresponding to the light beam L0 and the brightness in the region corresponding to the light beam L0' switching over in an image as the eyeball E0 moves. However, there is no reference in JP-A-2016-90802 to countermeasures against such uneven brightness, nor even to reference to uneven brightness itself.

SUMMARY

An advantage of some aspects of the embodiment is provision of a retinal scanning display device, and a beam width expander, in which uneven brightness is not liable to stand out in an image even when an eyeball has moved.

According to a first aspect of the embodiment, a retinal scanning display device includes a light source that emits a light beam, a scanning section that scans the light beam emitted from the light source to form a scanned image, a first beam width expander that expands a beam width of the light beam emitted from the scanning section by expanding in a first direction, and an optical system that makes the light beam, expanded in beam width by the first beam width expander, incident on an eye of a user. The first optical element includes a pair of first reflection faces facing each other along the first direction, plural first partially reflective layers disposed between the pair of first reflection faces and stacked along the first direction, and plural first light-transmissive layers disposed so as to be interposed between each of the pair of first reflection faces and an adjacent first partially reflective layer of the plural first partially reflective layers and interposed between adjacent first partially reflective layers of the plural first partially reflective layers. The first beam width expander includes a first incident face disposed at an end face of the first beam width expander at one side in a first length direction intersecting the first direction, and a first emission face disposed at an end face of the first beam width expander at the other side in the first length direction. At least one first partially reflective layer from out of the plural first partially reflective layers is a partially reflective layer having a transmittance exceeding 50%.

In this case, due to the beam width of the light beam being expanded in a first direction by the first beam width expander, occluded portions in images are not liable to arise even in cases in which an eyeball has moved in a direction corresponding to the first direction of an image seen by a user. Moreover, due to the partially reflective layer having a transmittance exceeding 50% being included in the plural first partially reflective layers employed in the first beam width expander, overall the light rays incident on the first beam width expander proceed appropriately along the first direction of the first beam width expander and are emitted. Thereby, at least one situation can be avoided out of a situation in which the amount of light reaching a retina changes greatly according to the direction the light beam enters the pupil, or a situation in which the relative magnitudes of the amount of light reaching the retina reverse according to the direction the light beam enters the pupil, even in cases in which the eyeball has moved in a direction corresponding to the first direction of an image being seen by a user. Thus, uneven brightness does not stand out in an image even in cases in which the eyeball has moved in a direction corresponding to the first direction of the image seen by the user.

In the retinal scanning display device, each of the plural first partially reflective layers may have a transmittance exceeding 50%. In this case, each of the plural first partially reflective layers may have a transmittance that is the same as each other. For example, each of the plural first partially reflective layers may have a transmittance exceeding 50% but not exceeding 60%. Such configurations enable uneven brightness, in which the brightness is different in each region, to be suppressed from being generated in the image seen by the user.

In the retinal scanning display device, the plural first partially reflective layers may include partially reflective layer having transmittances that are different to each other.

In the retinal scanning display device, the plural first partially reflective layers may be disposed such that the transmittances get sequentially higher on progression from one first reflection face that is on the side positioned on the direction of advance of incident light to the first incident face from out of the pair of first reflection faces, toward the other first reflection face from out of the pair of first reflection faces.

In the retinal scanning display device, each of the plural first partially reflective layers may have a transmittance from 50% to 90%.

In the retinal scanning display device, the first beam width expander may have a trapezoid profile in cross-section with inclined faces configured by the first incident face and the first emission face.

The retinal scanning display device may further include a second beam width expander that is disposed between the scanning section and the first beam width expander, or disposed between the first beam width expander and the optical system, and that expands the beam width of the light beam in a second direction intersecting the first direction. In this case, the second beam width expander includes: a pair of second reflection faces facing each other along the second direction, plural second partially reflective layers disposed between the pair of second reflection faces and stacked along the second direction; and plural second light-transmissive layers disposed so as to be interposed between each of the pair of second reflection faces and an adjacent second partially reflective layer of the plural second partially reflective layers and interposed between adjacent second partially reflective layers of the plural second partially reflective layers. Moreover, in this case, the second beam width expander includes a second incident face disposed at an end face of the second beam width expander at one side in a second length direction intersecting the second direction, and a second emission face disposed at an end face of the second beam width expander at the other side in the second length direction. According to the retinal scanning display device, due to the beam width of the light beam being expanded in the second direction of by the second beam width expander, missing bits are not liable to be generated in images even in cases in which the eyeball has moved in a direction corresponding to the second direction of the image being seen by the user.

In the retinal scanning display device, at least one second partially reflective layer from out of the plural second partially reflective layers may be a partially reflective layer having a transmittance exceeding 50%. In such a configuration, any changes in the amount of light reaching the retina according to the direction the light beam enters the pupil are small, even in cases in which the eyeball has moved in a direction corresponding to the second direction of an image being seen by a user. Uneven brightness, in which the brightness is different in each region, can accordingly be suppressed from being generated in the second direction of the image seen by the user.

In the retinal scanning display device, the second beam width expander may have a trapezoid profile in cross-section with inclined faces configured by the second incident face and the second emission face.

According to a second aspect of the embodiment, a beam width expander expands a beam width of an incident light beam by expanding in one direction. The beam width expander includes a pair of first reflection faces facing each other along the one direction, plural partially reflective layers disposed between the pair of reflection faces and stacked along the one direction, and plural light-transmissive layers disposed so as to be interposed between each of the pair of reflection faces and an adjacent partially reflective layer of the plural first partially reflective layers and so as to be interposed between adjacent first partially reflective layers of the plural first partially reflective layers. A stacked body configured by the pair of reflection faces, the plural partially reflective layers, and the plural light-transmissive layers includes an incident face disposed at an end face of the stacked body at one side in a length direction intersecting the one direction, and an emission face disposed at an end face of the stacked body at the other side along the length direction. At least one partially reflective layer from out of the plural partially reflective layers is a partially reflective layer having a transmittance exceeding 50%.

In the beam width expander, the stacked body may have a trapezoid profile in cross-section with inclined faces configured by the incident face and the emission face configured.

BRIEF DESCRIPTION OF THE DRAWINGS

The embodiment will be described with reference to the accompanying drawings, wherein like numbers reference like elements.

FIG. 4 is incident on an eye.

FIG. 4 is incident on an eye.

FIG. 11 is an explanatory diagram of a reference example to the first beam width expander illustrated in FIG. 3 and FIG. 4.

FIG. 12 is an explanatory diagram of an Example 1 of the first beam width expander illustrated in FIG. 3 and FIG. 4.

FIG. 13 is an explanatory diagram of an Example 2 of the first beam width expander illustrated in FIG. 3 and FIG. 4.

DESCRIPTION OF EXEMPLARY EMBODIMENTS

Figure 1:
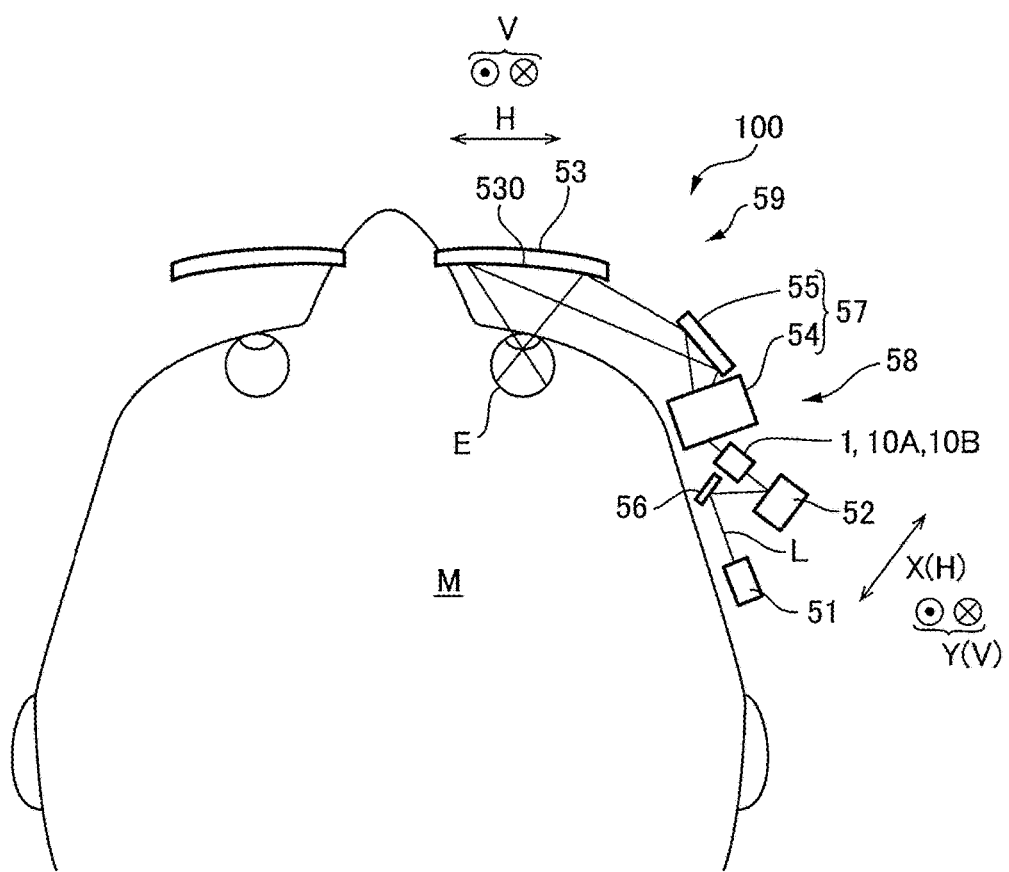
FIG. 1 is an explanatory diagram schematically illustrating an example of a configuration of a retinal scanning display device applied with the embodiment.

Explanation follows regarding embodiments. Note that in the drawings to be referenced in the following explanation, each layer and each member has been expanded enough to be seen on the drawing page, and the number and scaling of each layer and each member is different.

Example of Retinal Scanning Display Device Configuration

Figure 2:
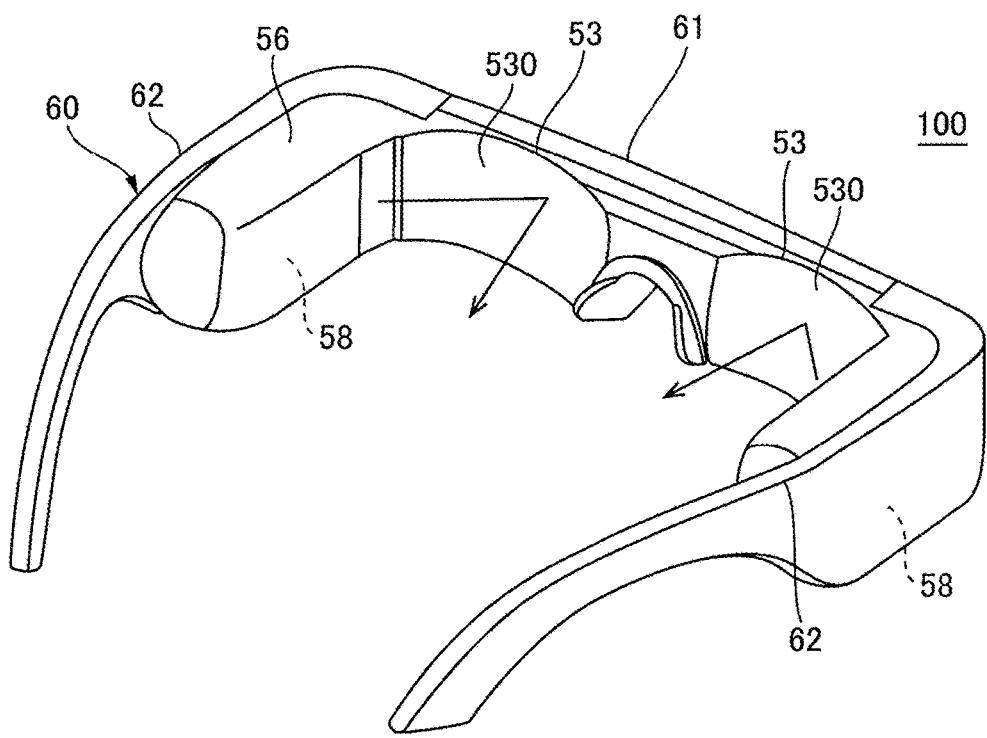
FIG. 2 is an explanatory diagram illustrating an example of the external appearance of the retinal scanning display device illustrated in FIG. 1.

FIG. 1 is an explanatory diagram schematically illustrating an example of a configuration of a retinal scanning display device 100 applied with the embodiment. FIG. 2 is an explanatory diagram illustrating an example of the external appearance of the retinal scanning display device 100 illustrated in FIG. 1. The retinal scanning display device 100 illustrated in FIG. 1 includes a light source 51 and a scanning section 52. The light source 51 emits a light beam L at the side of a head M of a user. The scanning section 52 scans the light beam L emitted from the light source 51, by scanning in a first direction X and in a second direction Y intersecting the first direction X at the side of the head M to form a scanned image. The retinal scanning display device 100 also includes a beam width expanding device 1 that expands the beam width of the light beam L emitted from the scanning section 52, and an optical system 59 that makes the light beam L expanded in beam width by the beam width expanding device 1 incident on an eye E of the user. In the present embodiment, the optical system 59 includes a light guiding optical system 57 that guides the light beam L emitted from the beam width expanding device 1, by guiding from the side of the head M to the front of the eye E, and a deflection member 53 disposed in front of the eye E. The deflection member 53 deflects the light beam L guided by the light guiding optical system 57 toward the eye E, causing the user to see a virtual image. In the present embodiment, the first direction X corresponds to the horizontal direction H in a virtual image for the incident light beam L, and the second direction Y corresponds to the vertical direction V in the virtual image for the incident light beam L.

The light guiding optical system 57 includes a lens system 54 such as a relay lens system or a projection lens system, and a light guiding mirror 55 that reflects the light beam emitted from the lens system 54 toward the deflection member 53. In the present embodiment, the beam width expanding device 1 includes a first beam width expander 10A that expands the beam width of the light beam L emitted from the light source 51 by expanding in the first direction X, and a second beam width expander 10B that expands the beam width of the light beam L expanded in beam width by the first beam width expander 10A by expanding in the second direction Y.

The light source 51 includes, for example, a red laser element that emits red light, a green laser element that emits green light, and a blue laser element that emits blue light. The light source 51 also includes a half mirror or the like to combine the light paths of these laser elements. Under control of a controller (not illustrated in the drawings), the red laser element, the green laser element, and the blue laser element emit modulated light beams at a light intensity corresponding to each dot on an image to be displayed. Note that the light source 51 may employ an optical member such as a lens to convert diverging light into parallel light.

The scanning section 52 may, for example, be realized by a micro mirror device formed by utilizing micro electro mechanical systems (MEMS) employing, for example, a silicon substrate. In such cases, the scanning section 52 may employ a configuration that uses a single scanning mechanism to scan incident light in the two directions corresponding to the horizontal direction and the vertical direction of the image. The scanning section 52 may also be configured by a first scanning mechanism to scan incident light in one direction out of two directions corresponding to the first direction X and the second direction Y, and a second scanning mechanism to scan incident light in the other direction of the two directions. Such a scanning section 52 scans incident light in a predetermined direction under control of a controller (not illustrated in the drawings).

The deflection member 53 includes a deflection layer 530 that reflects light projected from the light guiding optical system 57 and makes the reflected light incident on the eye E of a user. In the present embodiment, the deflection member 53 is a partially transmissive combiner configured from a holographic element or the like. Thus, due to external light also being incident on the eye E via the deflection member 53 (the combiner), a user is able to see an image in which the image formed by the retinal scanning display device 100 and external light (the background) are overlaid. Namely, retinal scanning display device 100 is configured as a see-through head mounted display device.

In cases in which the thus configured retinal scanning display device 100 configures a see-through eyeglass display, the retinal scanning display device 100 is formed in a shape like that of glasses, as illustrated in FIG. 2. In order to make modulated light incident onto each of the left and right eyes E of a user, the retinal scanning display device 100 includes a frame 60 to support the deflection member 53 for the left eye and the deflection member 53 for the right eye at a front section 61, and optical units 58 including the optical components described with reference to FIG. 1 are provided at each of left and right temples 62 of the frame 60. In this case, the light source 51, the scanning section 52, the beam width expanding device 1, and the optical system 59 are all provided to the optical units 58. Alternatively, configuration may be made such that just the scanning section 52, the beam width expanding device 1, and the optical system 59 are provided to the optical units 58, and the optical units 58 and the light source 51 are connected together by an optical cable or the like.

Beam Width Expanding Device 1 Configuration

Figure 3:
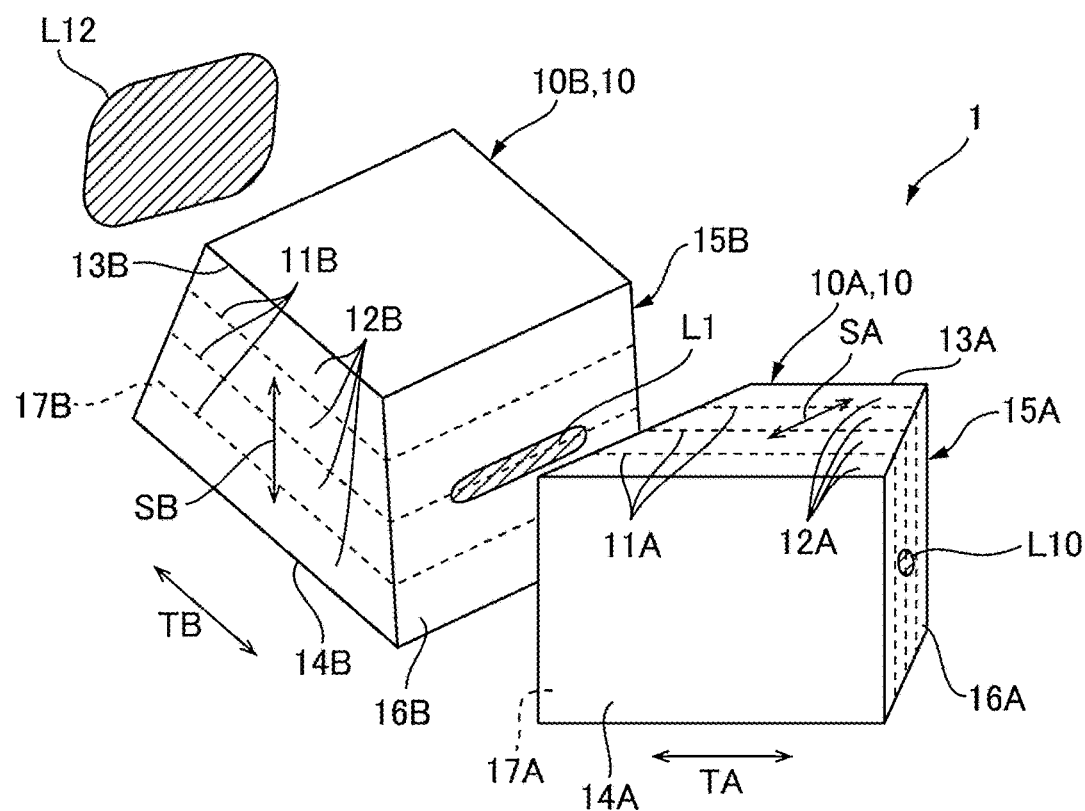
FIG. 3 is a perspective view schematically illustrating an aspect of the beam width expanding device illustrated in FIG. 1.
Figure 4:
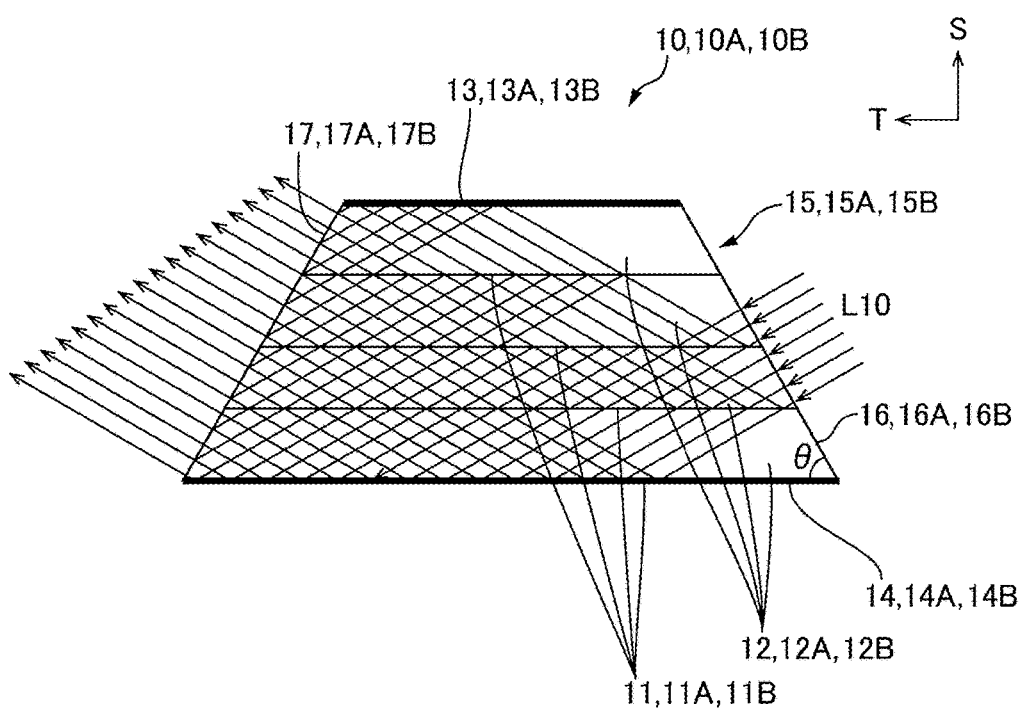
FIG. 4 is an explanatory diagram schematically illustrating a cross-section of a beam width expander employed as the first beam width expander and the second beam width expander illustrated in FIG. 3.

FIG. 3 is a perspective view schematically illustrating an aspect of the beam width expanding device 1 illustrated in FIG. 1. FIG. 4 is an explanatory diagram schematically illustrating a cross-section of the beam width expander 10 employed as the first beam width expander 10A and the second beam width expander 10B illustrated in FIG. 3. Note that although the number of layers of light-transmissive layers 12 is illustrated as four layers in FIG. 4, in reality there are, for example, about ten stacked layers of the light-transmissive layers 12. Light rays reflected by the emission face 17 are omitted from illustration in FIG. 4. Moreover, the partially reflective layers 11 are illustrated as dashed lines in FIG. 3 in order to indicate the stacking direction of the light-transmissive layers 12 and the partially reflective layers 11.

In the following description, a stacking direction S means a direction orthogonal to the light-transmissive layers 12 and the partially reflective layers 11 irrespective of the external profiles of the first beam width expander 10A and the second beam width expander 10B. Thus, a first direction X in which the first beam width expander 10A expands the beam width is a direction parallel to a stacking direction SA of first light-transmissive layers 12A and first partially reflective layers 11A in the first beam width expander 10A, and a second direction Y in which the second beam width expander 10B expands the beam width is a direction parallel to a stacking direction SB of second light-transmissive layers 12B and second partially reflective layers 11B in the second beam width expander 10B.

As illustrated in FIG. 3, the beam width expanding device 1 of the present embodiment includes the first beam width expander 10A that is disposed between the scanning section 52 and the optical system 59 illustrated in FIG. 1 and that expands the beam width of the light beam L emitted from the scanning section 52 in the first X direction, and includes the second beam width expander 10B that is disposed between the scanning section 52 and the first beam width expander 10A, or between the first beam width expander 10A and the optical system 59, and that expands the beam width of the light beam L in the second direction Y. In the present embodiment, the second beam width expander 10B is disposed between the first beam width expander 10A and the optical system 59.

In the beam width expanding device 1 configured in this manner, the first beam width expander 10A and the second beam width expander 10B are each configured by the beam width expander 10 illustrated in FIG. 4. The beam width expander 10 includes a pair of reflection faces 13, 14 facing each other along one direction (the stacking direction S), the plural partially reflective layers 11 disposed between the pair of reflection faces 13, 14 and stacked in the one direction, and the light-transmissive layers 12 stacked so as to be interposed between each of the pair of reflection faces 13, 14 and the adjacent partially reflective layer 11 and between the adjacent partially reflective layers 11. In the beam width expander 10, a stacked body 15 configured by the reflection faces 13, 14, the partially reflective layers 11, and the light-transmissive layers 12, includes an incident face 16 configured by an end face of the stacked body 15 on one side along a length direction T intersecting the one direction, and an emission face 17 configured by an end face of the stacked body 15 at the other side along the length direction T. In the present embodiment, the beam width expander 10 has a trapezoid profile in cross-section with inclined faces configured by the incident face 16 and the emission face 17.

Thus, as illustrated in FIG. 3, the first beam width expander 10A includes a pair of reflection faces 13A, 14A facing each other along the first direction X, plural of the partially reflective layers 11A disposed between the pair of first reflection faces 13A, 14A and stacked in the first direction X, and the first light-transmissive layers 12A stacked so as to be interposed between each of the pair of first reflection faces 13A, 14A and the adjacent first partially reflective layer 11A and between the adjacent first partially reflective layers 11A. The first beam width expander 10A also includes a first stacked body 15A configured by the first reflection faces 13A, 14A, the first partially reflective layers 11A, and the first light-transmissive layers 12A. A first incident face 16A is configured by an end face of the first stacked body 15A on one side along a first length direction TA intersecting the first direction X and the second direction Y, and a first emission face 17A is configured by an end face of the first stacked body 15A at the other side along the first length direction TA. The first beam width expander 10A has a trapezoid profile in cross-section with inclined faces configured by a first incident face 16A and a first emission face 17A. The first length direction TA dimension of the first reflection faces 13A is shorter than the first length direction TA dimension of the first reflection face 14A.

The second beam width expander 10B includes a pair of second reflection faces 13B, 14B facing each other along the second direction Y, plural of the second partially reflective layers 11B disposed between the pair of second reflection faces 13B, 14B and stacked in the second direction Y, and the second light-transmissive layers 12B stacked so as to be interposed between each of the pair of second reflection faces 13B, 14B and the adjacent second partially reflective layer 11B and between the adjacent second partially reflective layers 11B. In the second beam width expander 10B, a second stacked body 15B configured by the second reflection faces 13B, 14B, the second partially reflective layers 11B, and the second light-transmissive layers 12B includes a second incident face 16B configured by an end face of the second stacked body 15B on one side along a second length direction TB intersecting the first direction X and the second direction Y, and a second emission face 17B configured by an end face of the second stacked body 15B at the other side along the second length direction TB. The second beam width expander 10B has a trapezoid profile in cross-section with inclined faces configured by the second incident face 16B and the second emission face 17B. The second length direction TB dimension of the second reflection faces 13B is shorter than the second length direction TB dimension of the second reflection face 14B.

Returning to FIG. 4, the light-transmissive layers 12 are configured by substrates, such as glass substrates or quartz substrates, and by light-transmissive adhesive layers (not illustrated in the drawings). The thicknesses of each of the plural light-transmissive layers 12 are equal. The reflection faces 13, 14 are configured by an interface where a vacuum-deposited reflective metal film, such as of aluminum, contacts the light-transmissive layers 12. Note that the reflection faces 13, 14 may be reflection faces employing differences in refractive index according to Snell's law. The partially reflective layers 11 are configured from dielectric multilayer films of alternately stacked dielectric films of low dielectric constant and dielectric films of high dielectric constant, selected from inorganic films, such as silicon dioxide ($SiO_2$), titanium dioxide ($TiO_2$), alumina ($Al_2O_3$), calcium fluoride ($CaF_2$), magnesium fluoride ($MgF_2$), zinc sulfide (ZnS), and zirconium dioxide ($ZrO_2$). In the present embodiment, the partially reflective layers 11 are configured by dielectric multilayer films formed by alternately stacking $SiO_2$ and $TiO_2$ using vacuum deposition.

In the beam width expander 10 configured as described above, when the light beam L10 from a direction angled with respect to the stacking direction S is incident in a parallel light beam state on the incident face 16, the light beam L10 advances in the length direction T while being repeatedly reflected by the reflection surface 13, reflected by the reflection face 14, transmitted by the partially reflective layers 11, and reflected by the partially reflective layers 11. The light beam is then emitted from the emission face 17 still as a parallel light beam in a state having a beam width expanded in the one direction S.

Thus, in the beam width expanding device 1 illustrated in FIG. 3, in the first beam width expander 10A, when the light beam L10 from a direction inclined with respect to the first direction X is incident in a parallel light beam state on the first incident face 16A, the light beam L10 advances in the length direction TA of the first beam width expander 10A and is emitted from the first emission face 17A still as a parallel light beam as the light beam L11 expanded in beam width in the first direction X.

Next, in the second beam width expander 10B, when the light beam L1 from a direction inclined with respect to the second direction Y is incident in a parallel light beam state on the second incident face 16B, the light beam L1 advances in the length direction TB of the second beam width expander 10B and is emitted from the second emission face 17B still as a parallel light beam in a state expanded in beam width in the second direction Y. As a result, a light beam L12 is emitted from the second emission face 17B, the light beam L12 being the light beam L expanded in beam width in the first direction X and in the second direction Y. In the present embodiment, the first emission face 17A of the first beam width expander 10A and the second incident face 16B of the second beam width expander 10B face each other across a gap.

Relationship Between Position of Eyeball E0 and Light Beam L

Explanation follows regarding relationships and the like between the position of an eyeball E0 and the light beam L. The following explanation will focus on the positional relationships and the like in the first beam width expander 10A between the light beam L expanded in beam width in the first direction X (the image horizontal direction H) and the eyeball E0.

Figure 5:
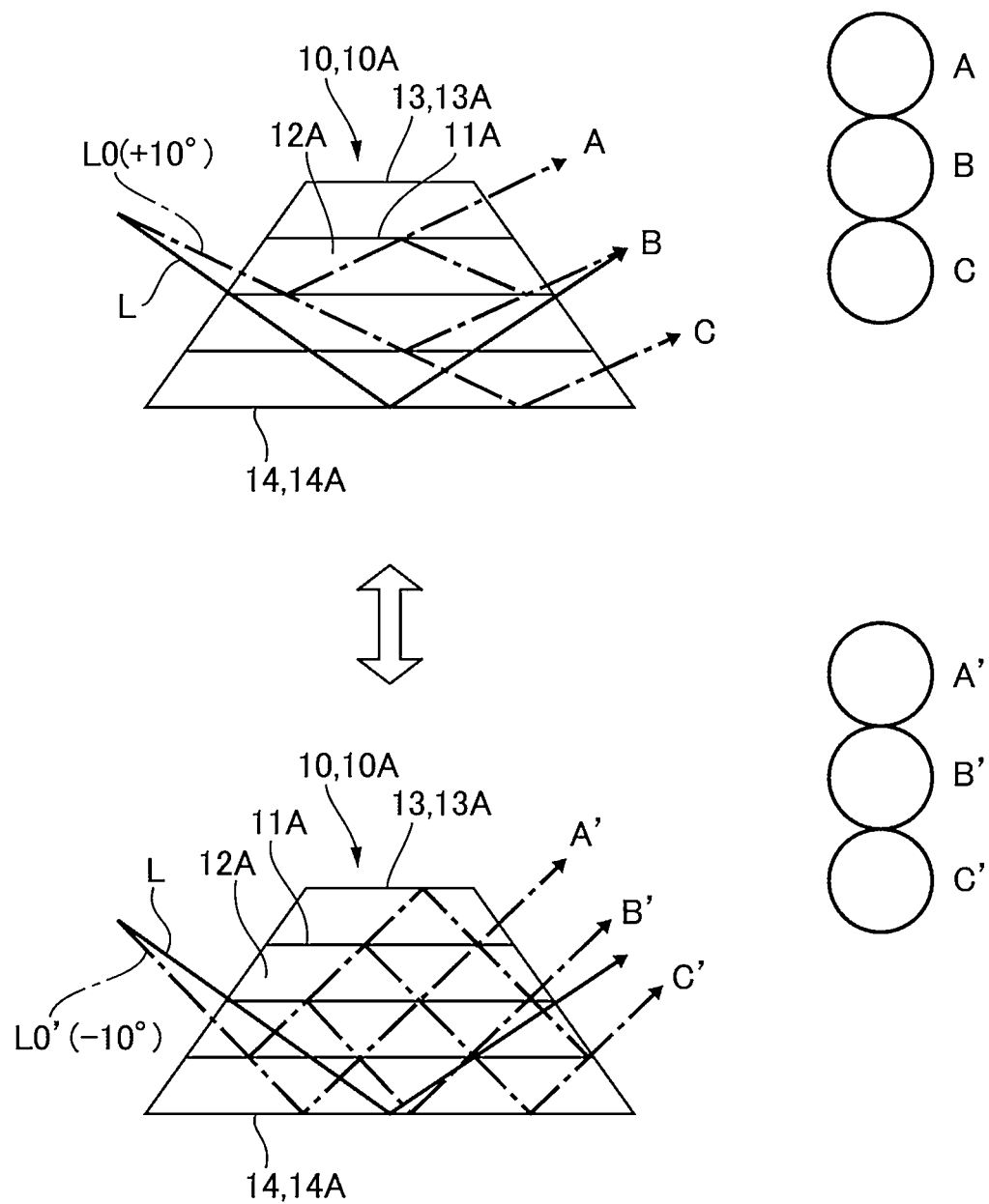
FIG. 5 is an explanatory diagram illustrating a manner in which a light beam is incident at different angles to the beam width expander illustrated in FIG. 3 and FIG. 4.
Figure 6:
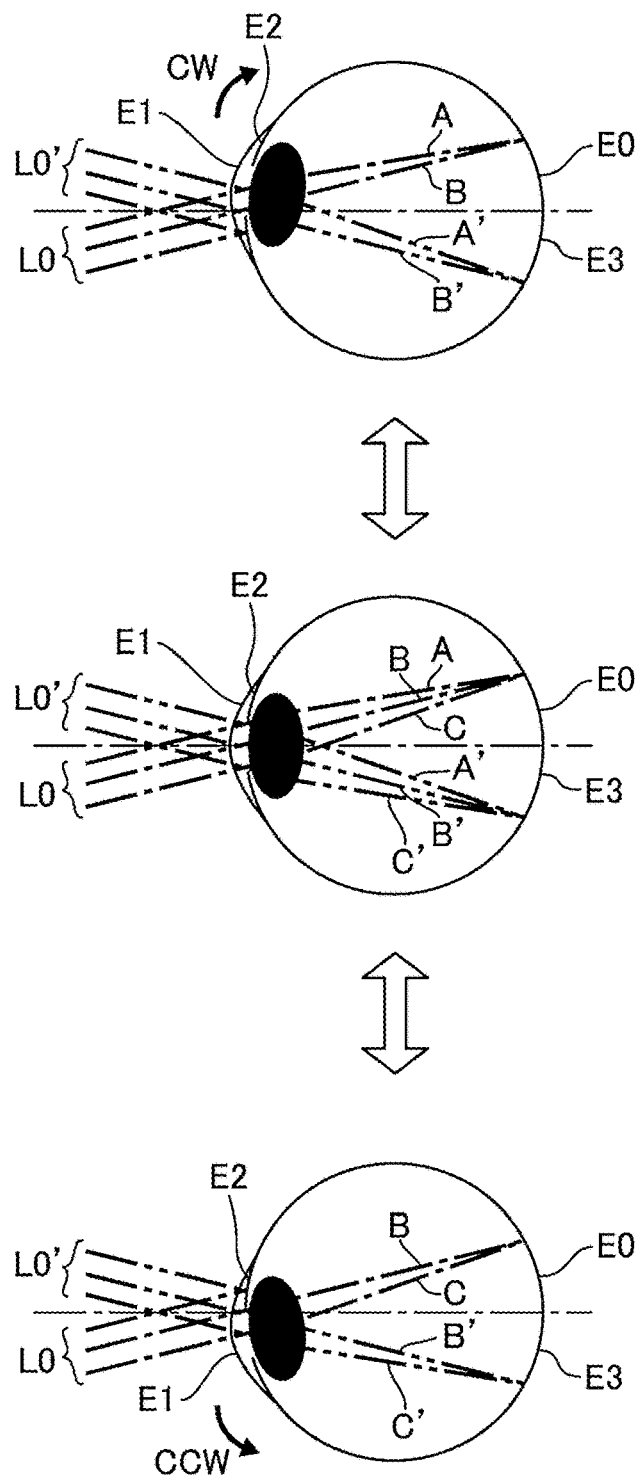
FIG. 6 is an explanatory diagram illustrating a manner in which light is emitted from the beam width expander illustrated in FIG. 3
Figure 7:
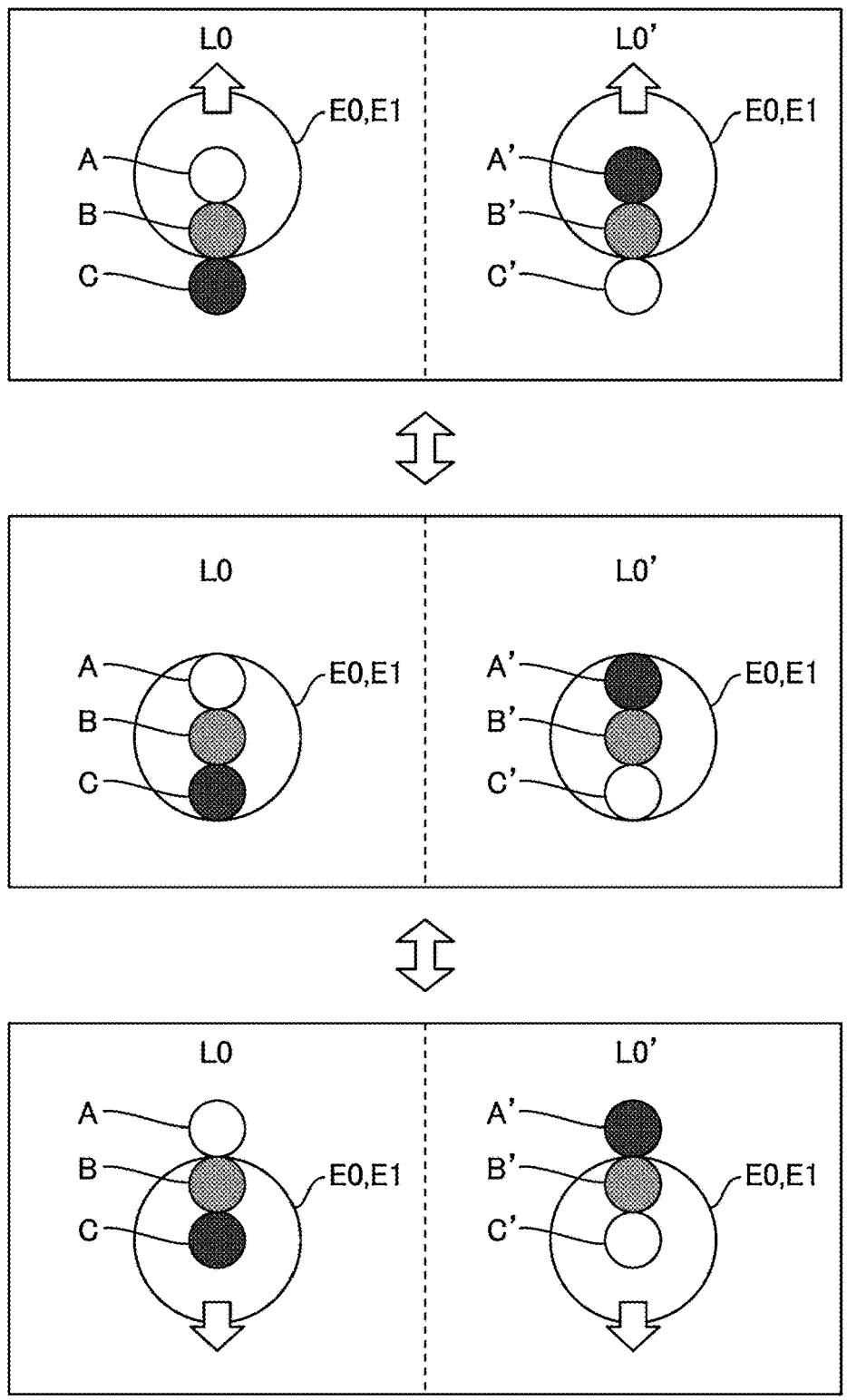
FIG. 7 is an explanatory diagram illustrating a relationship between orientation of an eyeball and light rays entering a pupil.
Figure 8:
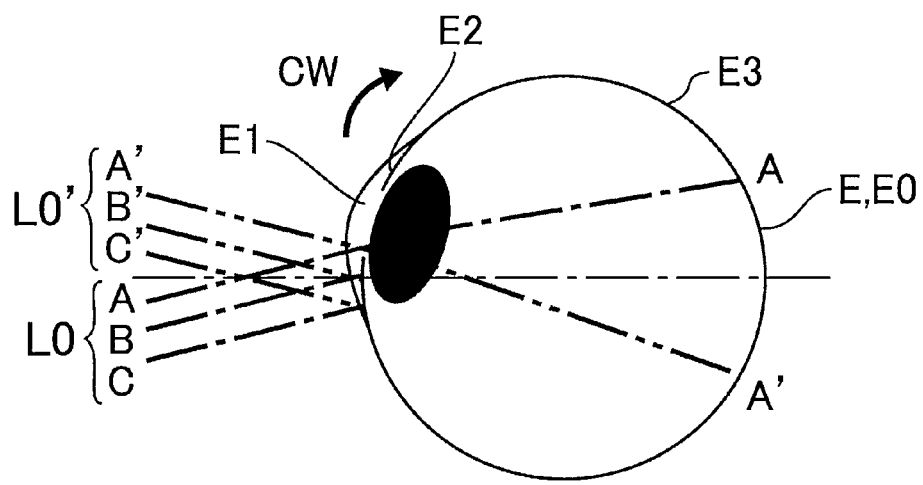
FIG. 8 is an explanatory diagram illustrating another manner in which light emitted from the beam width expander illustrated in FIG. 3
Figure 8:
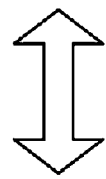
Figure 8:
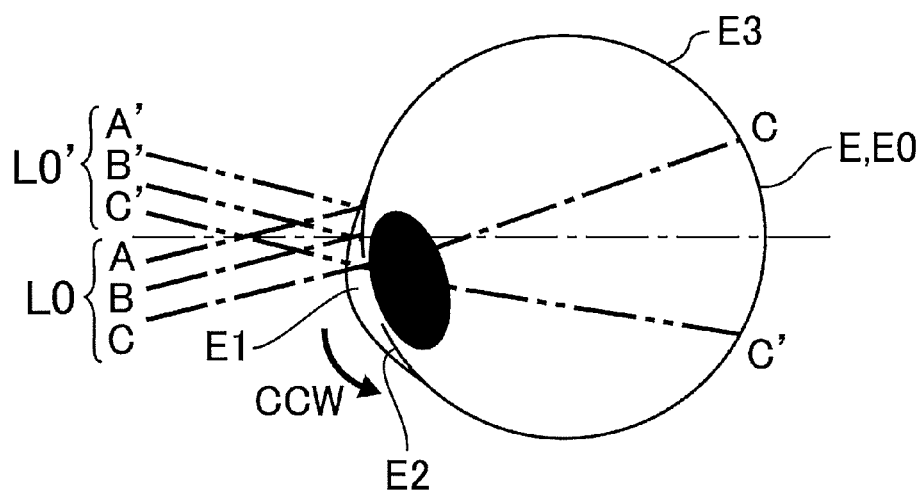

FIG. 5 is an explanatory diagram illustrating a manner in which a light beam L is incident at different angles to the beam width expander 10 illustrated in FIG. 3 and FIG. 4. In FIG. 5, the light beam L incident to the incident face 16 (the first incident face 16A) of the beam width expander 10 (the first beam width expander 10A) perpendicularly is indicated with a solid line, the light beam L0 incident thereto at an angle of +10° with respect to the light beam L is indicated with a dashed line, and the light beam L0' incident thereto at an angle of −10° with respect to the light beam L is indicated with a dashed line. FIG. 6 is an explanatory diagram illustrating a manner in which light emitted from the beam width expander 10 illustrated in FIG. 3 and FIG. 4 is incident to the eyeball E0. The middle diagram in FIG. 6 illustrates a situation in which the eyeball E0 is facing forward, the top diagram in FIG. 6 illustrates a situation in which the eyeball E0 has moved in one direction CW, and the bottom diagram of FIG. 6 illustrates a situation in which the eyeball E0 has moved in another direction CCW. FIG. 7 is an explanatory diagram illustrating a relationship between orientation of the eyeball E0 and light rays entering a pupil E1. The middle diagram in FIG. 7 illustrates a situation in which the eyeball E0 is facing forward, the top diagram in FIG. 7 illustrates a situation in which the eyeball E0 has moved in the one direction CW, and the bottom diagram of FIG. 7 illustrates a situation in which the eyeball E0 has moved in the other direction CCW. FIG. 8 is an explanatory diagram illustrating another manner in which light emitted from the beam width expander 10 illustrated in FIG. 3 and FIG. 4 is incident on the eye E. The top diagram in FIG. 8 illustrates a situation in which the eyeball E0 has moved even further in the one direction CW than in the situation in FIG. 6, and the bottom diagram of FIG. 8 illustrates a situation in which the eyeball E0 has moved even further in the other direction CCW than in the situation in FIG. 6.

As illustrated in FIG. 5, in the first beam width expander 10A, accompanying scanning by the scanning section 52 illustrated in FIG. 1, the angle of incidence of the light beam L on the first incident face 16A of the first beam width expander 10A changes and the emission angle from the first emission face 17A of the first beam width expander 10A changes. Thus, in the incident light beam L0 angled at +10° with respect to the light beam L incident perpendicularly to the first incident face 16A of the first beam width expander 10A, light rays are emitted at intensities A, B, C along the expansion direction of the beam width of the light beam L0. Moreover, in incident light beam L0' angled at −10° with respect to the light beam L incident perpendicularly to the first incident face 16A of the first beam width expander 10A, light rays are emitted at intensities A', B', C' along the expansion direction of the beam width of the light beam L0'.

Moreover, as illustrated in FIG. 6 and FIG. 7, when the eyeball E0 moves, the portion of the light beam L blocked by the iris E2 changes according to the incident direction of the light beam with respect to the pupil E1. For example, when the eyeball E0 is facing forward, light rays of intensities A, B, C in the light beam L0 reach the retina E3, and light rays of intensities A', B', C' in the light beam L0' reach the retina E3. By contrast, when the eyeball E0 moves so as to rotate in the one direction CW, the light rays of intensities A, B in the light beam L0 reach the retina E3 and the light rays of intensities A', B' in the light beam L0' reach the retina E3. Moreover, when the eyeball E0 moves so as to rotate in the other direction CCW, the light rays of intensities B, C in the light beam L0 reach the retina E3 and the light rays of intensities B', C' in the light beam L0' reach the retina E3.

Moreover, as illustrated in FIG. 8, when the eyeball E0 moves so as to rotate further in the one direction CW, the light ray of intensity A in the light beam L0 reaches the retina E3 and the light ray of intensity A' in the light beam L0' reaches the retina E3. By contrast, when the eyeball E0 moves so as to rotate further in the other direction CCW, the light ray of intensity C in the light beam L0 reaches the retina E3 and the light ray of intensity C' in the light beam L0' reaches the retina E3.

Thus, even if the eyeball E0 moves such that the portion of the light beam L blocked by the iris E2 changes, as long as the following Equations P1 to P5 are all satisfied, the amount of light reaching the retina E3 is constant in the region of the image corresponding to the light beam L0 and in the region of the image corresponding to the light beam L0' despite the eyeball E0 moving. Accordingly, uneven brightness does not arise in the region of the image corresponding to the light beam L0 and the region of the image corresponding to the light beam L0' even if the eyeball E0 moves. Note that out of the following Equations P1 to P5, the Equations P1 to P3 are conditional equations, and the Equations P4, P5 are equations derived from Equations P1 to P3.

$$A/A'=100\%$$ Equation P1:

$$(A+B)/(A'+B')=100\%$$ Equation P2:

$$(A+B+C)/(A'+B'+C')=100\%$$ Equation P3:

$$(B+C)/(B'+C')=100\%$$ Equation P4:

$$C/C'=100\%$$ Equation P5:

Moreover, as long as the differences in values found by the following equations satisfy, for example condition P6 of being small within 40% of each other, the relative magnitudes of the light intensities reaching the retina E3 for the light beams L0, L0' do not reverse even if the eyeball E0 moves such that the portion of the light beam L blocked by the iris E2 changes. Thus uneven brightness does not stand out even if the Eyeball E0 moves and even if there is a difference in brightness in the region of an image corresponding to the light beam L0 and the region of the image corresponding to the light beam L0'.

$$A/A'$$

$$(A+B)/(A'+B')$$

$$(A+B+C)/(A'+B'+C')$$

$$(B+C)/(B'+C')$$

$$C/C'$$

Thus, uneven brightness does not stand out as long as at least Equations P1 to P5 are satisfied, or condition P6 is satisfied. Hence, in the present embodiment, the first beam width expander 10A is appropriately adjusted in the following manner such that uneven brightness does not stand out, as described below with reference to FIG. 9 to FIG. 13.

First Beam Width Expander 10A Configuration Example 1

Figure 9:
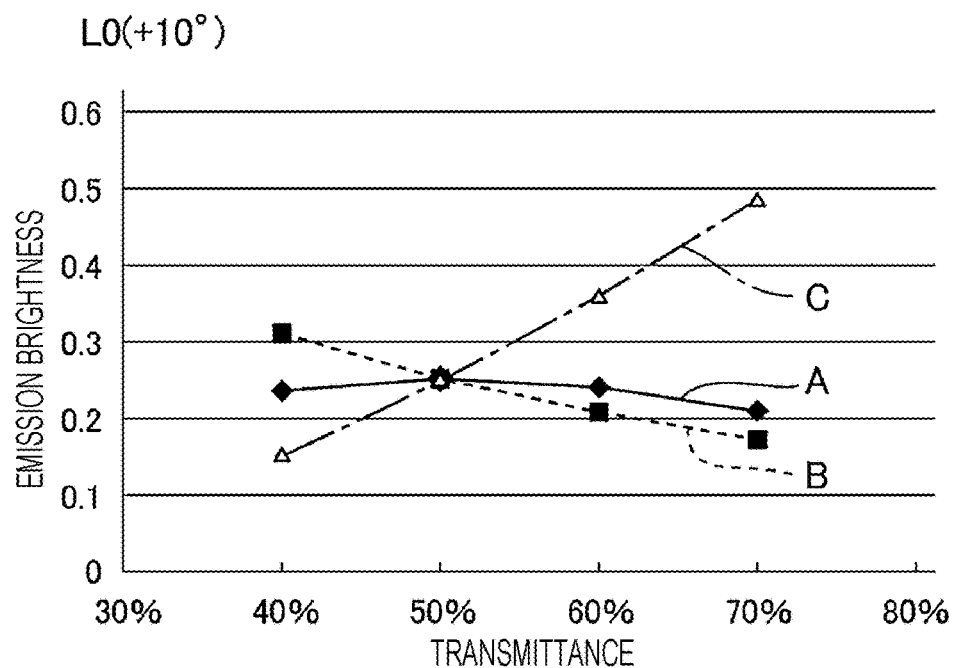
FIG. 9 is an explanatory diagram illustrating a relationship between a transmittance of a first partially reflective layer and emission brightness in the first beam width expander illustrated in FIG. 3 and FIG. 4.
Figure 9:
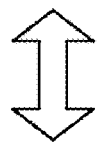
Figure 9:
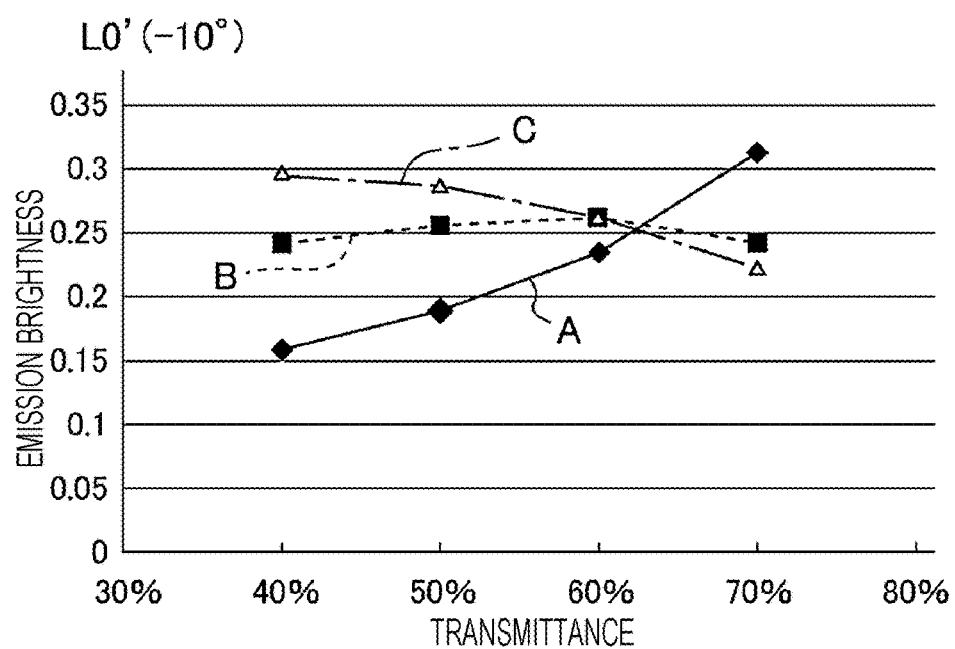
Figure 10:
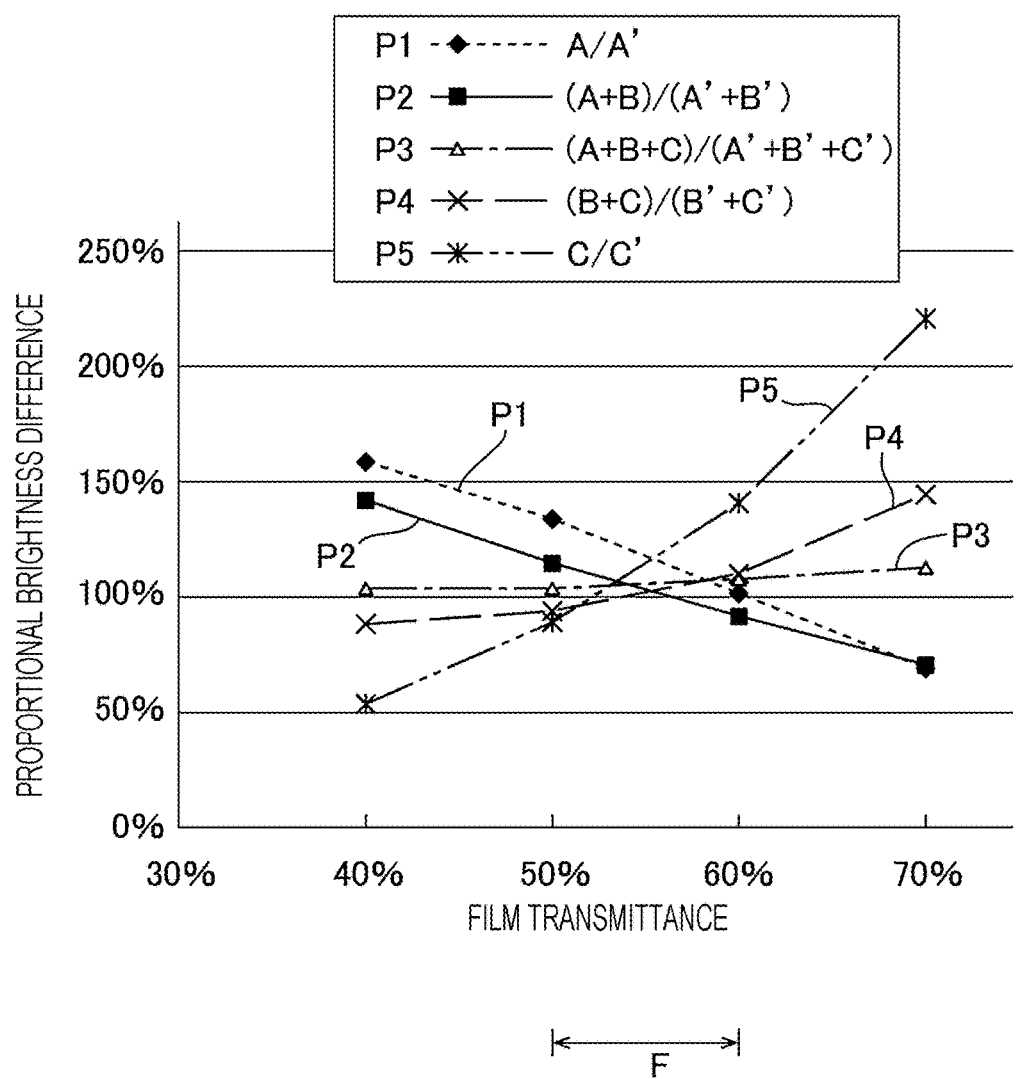
FIG. 10 is a graph illustrating results of conditions 1 to 5 investigated based on the results illustrated in FIG. 9.

First, a Configuration Example 1 satisfying Equations P1 to P5 will be described, with reference to FIG. 9 to FIG. 12. FIG. 9 is an explanatory diagram illustrating a relationship between a transmittance and emission brightness of the first partially reflective layers 11A of the first beam width expander 10A illustrated in FIG. 3 and FIG. 4. The upper graph of FIG. 9 illustrates the light rays of intensities A, B, C of the light beam L0, and the lower graph of FIG. 9 illustrates light rays of intensities A', B', C' of the light beam L0'. FIG. 10 is a graph illustrating results of conditions 1 to 5 investigated based on the results illustrated in FIG. 9, and illustrates relationships between the results computed for the proportional brightness difference in relation to Equations P1 to P5, and the transmittance of the first partially reflective layers 11A. Note that the results illustrated in FIG. 9 and FIG. 10 are for cases in which the plural first partially reflective layers 11A all have the same transmittance as each other.

When the transmittances of the first partially reflective layers 11A of the first beam width expander 10A illustrated in FIG. 3 and FIG. 4 are changed, the intensities A, B, C of the light beam L0 and the intensities A', B', C' of the light beam L0' can be found from the equations below. Accordingly, the intensities A, B, C of the light beam L0 change as illustrated in the upper graph of FIG. 9, and the intensities A', B', C' of the light beam L0' change as illustrated in the lower graph of FIG. 9. In the following equations, a is the transmittance, and b is the reflectance (reflectance=100%−transmittance). The intensities A, B, C of the light beam L0 and the intensities A', B', C' of the light beam L0' are values computed by using the transmittance a and the reflectance b to multiply the degree with which each of the light rays illustrated in FIG. 5 pass through the first partially reflective layers 11A or are reflected thereby.

$$A=a\times b$$

$$B=(a^2\times b+b^3)$$

$$C=a^2$$

$$A'=a^4+2\times(a^2\times b^3)+(a^2\times b^2)$$

$$B'=(a^3\times b^3)+4\times(a^3\times b^2)+(a^3\times b)+3\times(a\times b^5)$$

$$C'=3\times(a^4\times b^2)+(a\times b^4)+3\times(a^2\times b^5)+3\times(a^2\times b^4)+2\times(a^2\times b^3)+(a^2\times b^2)+b^7$$

Moreover, FIG. 10 illustrates results of relationships found between the transmittance a and each of the ratios of the Equations P1 to P5 based on the results illustrated in FIG. 9. Accordingly, based on the results illustrated in FIG. 10 and also on the results of investigations into changing the conditions, in order to substantially satisfy the Equations P1 to P5, the plural first partially reflective layers 11A need to include partially reflective layers having a transmittance exceeding 50%. Preferably, in order to substantially satisfy the Equations P1 to P5, the plural first partially reflective layers 11A each need to have a transmittance exceeding 50%. As illustrated in range F in FIG. 10, more preferably, the plural first partially reflective layers 11A each need to have a transmittance that exceeds 50% but does not exceed 60%.

Reference Example to Embodiment

FIG. 11 is an explanatory diagram of a reference example to the first beam width expander 10A illustrated in FIG. 3 and FIG. 4, and illustrates investigation results of each of the Equations P1 to P5 in cases in which the transmittances of the plural first partially reflective layers 11A are all 50%.

In the present example, the transmittances of the plural first partially reflective layers 11A are all 50%, and the intensities are the following values.

A=0.250
B=0.250
C=0.250
A'=0.188
B'=0.250
C'=0.281

Thus, as illustrated in FIG. 11, the values corresponding to the Equations P1 to P5 are as follows.

$A/A' = 133.3\%$  Equation P1:

$(A+B)/(A'+B') = 114.3\%$  Equation P2:

$(A+B+C)/(A'+B'+C') = 104.3\%$  Equation P3:

$(B+C)/(B'+C') = 94.1\%$  Equation P4:

$C/C' = 88.9\%$  Equation P5:

Thus, in the reference example, the Equation P3 is satisfied when all light rays enter the pupil E1, and so there is only a small degree of unevenness generated over the entire picture region. However, due to the Equations P1, P2, P4, P5 not being satisfied, when the eyeball E0 has moved as illustrated in FIG. 6 to FIG. 8, a large unevenness in brightness is generated across the entire picture region. Moreover, due to condition P6 not being satisfied, the relative magnitude of the brightness between the regions switches over in the picture when the eyeball E0 has moved. Uneven brightness accordingly stands out. The reason therefore is thought to be that when the transmittance a is 50% for all the partially reflective layers 11, sufficient light does not reach the first reflection face 13A side illustrated in FIG. 4 and light emitted is concentrated on the first reflection face 14A side, such that the light intensity distribution after expanding the beam width of the light beams L0, L0' cannot be appropriately adjusted.

Embodiment Example 1

FIG. 12 is an explanatory diagram of an Example 1 of the first beam width expander 10A illustrated in FIG. 3 and FIG. 4, and illustrates investigation results for each of the Equations P1 to P5 in cases in which the transmittance is 55% for all of the plural first partially reflective layers 11A.

In the present example, the transmittances of the plural first partially reflective layers 11A are all 55%, and the intensities are the following values.

A=0.248
B=0.227
C=0.303
A'=0.208
B'=0.255
C'=0.271

Thus, as illustrated in FIG. 12, the values corresponding to the Equations P1 to P5 are as follows.

$A/A' = 119.3\%$  Equation P1:

$(A+B)/(A'+B') = 102.5\%$  Equation P2:

$(A+B+C)/(A'+B'+C') = 105.9\%$  Equation P3:

$(B+C)/(B'+C') = 100.7\%$  Equation P4:

$C/C' = 111.7\%$  Equation P5:

In Example 1, due to sufficient light reaching the first reflection face 14A illustrated in FIG. 4, the Equation P3 is satisfied in cases in which all the light rays enter the pupil E1, and the Equations P2, P4 are satisfied in cases in which the eyeball E0 has moved to the extent illustrated in FIG. 6, and accordingly the degree of unevenness generated over the entire picture region is small. However, due to Equations P2, P5 not being satisfied, uneven brightness is generated in cases in which the eyeball E0 has moved to the extent illustrated in FIG. 8, albeit that the extent of uneven brightness is suppressed more than in the reference example. Due to the condition P6 being satisfied in this case also, a situation does not arise in which the relative magnitude of the brightness between the regions switches over in the picture when the eyeball E0 has moved. This enables a situation in which uneven brightness stands out to be avoided.

Another Configuration Example of First Beam Width Expander 10A (Embodiment Example 2)

FIG. 13 is an explanatory diagram of an Example 2 of the first beam width expander 10A illustrated in FIG. 3 and FIG. 4, and illustrates investigation results for Equations P1 to P5 in cases in which the transmittances of three first partially reflective layers 11A provided in sequence from the first reflection face 14A side to the first reflection faces 13A side are 50%, 65%, and 90%, respectively.

Namely, in the present example, there is a partially reflective layer having a transmittance exceeding 50% included in the plural first partially reflective layers 11A. Moreover, in the present example, there are plural partially reflective layers having different transmittances to each other included in the plural first partially reflective layers 11A. Moreover, in the present example, the plural partially reflective layers having different transmittances to each other are disposed such that the transmittances get sequentially higher on progression from the one first reflection face 14A that is on the side positioned on the direction of advance of the light incident to the first incident face 16A out of the pair of first reflection faces 13A, 14A toward the other first reflection face 13A out of the pair of first reflection faces 13A, 14A. The plural partially reflective layers having different transmittances have transmittances of from 50% to 90%. Thus, light reaching the first reflection face 13A illustrated in FIG. 4 is more sufficient than in cases in which the transmittances of the plural first partially reflective layers 11A are all 50%.

When the first beam width expander 10A configured in this manner is employed, the values of the intensities of each of the light rays in the light beam L0, L0' are as follows.

A=0.315
B=0.299
C=0.325
A'=0.237
B'=0.255
C'=0.254

Thus, as illustrated in FIG. 13, the values corresponding to the Equations P1 to P5 are as follows.

$A/A' = 133.3\%$  Equation P1:

$(A+B)/(A'+B') = 124.7\%$  Equation P2:

$(A+B+C)/(A'+B'+C') = 125.8\%$  Equation P3:

$(B+C)/(B'+C') = 122.5\%$  Equation P4:

$C/C' = 128.0\%$  Equation P5:

Thus in Example 2, due to the Equations P1 to P5 not being satisfied, uneven brightness is generated in cases in which the eyeball E has moved, albeit that the extent of uneven brightness is suppressed more than in the reference example. However, due to condition P6 being satisfied, a state is not liable to arise in which the relative magnitude of brightness switches over between regions in the picture when the eyeball E0 has been rotated. This enables a situation in which uneven brightness stands out to be avoided.

Note that in addition to the present example, in results of investigations into the other conditions, if partially reflective layers having transmittances exceeding 50% are included in the plural first partially reflective layers 11A, the light reaching the first reflection face 13A illustrated in FIG. 4 is more sufficient than in cases in which the transmittances of the plural first partially reflective layers 11A are all 50%. Further, in cases in which plural partially reflective layer having different transmittances are included in the plural first partially reflective layers 11A, sufficient light reaches the first reflection face 13A illustrated in FIG. 4 in cases in which such plural partially reflective layers are disposed such that the transmittances get sequentially lower on progression from the one first reflection face 14A that is on the side positioned on the direction of advance of light incident to the first incident face 16A out of the pair of first reflection faces 13A, 14A, toward the other first reflection face 13A out of the pair of first reflection faces 13A, 14A. Moreover, in cases in which the transmittances of the plural partially reflective layers having different transmittances are from 50% to 90%, sufficient light reaches the first reflection face 13A illustrated in FIG. 4.

Light Ray Analysis Results of First Beam Width Expander 10A

Figure 14:
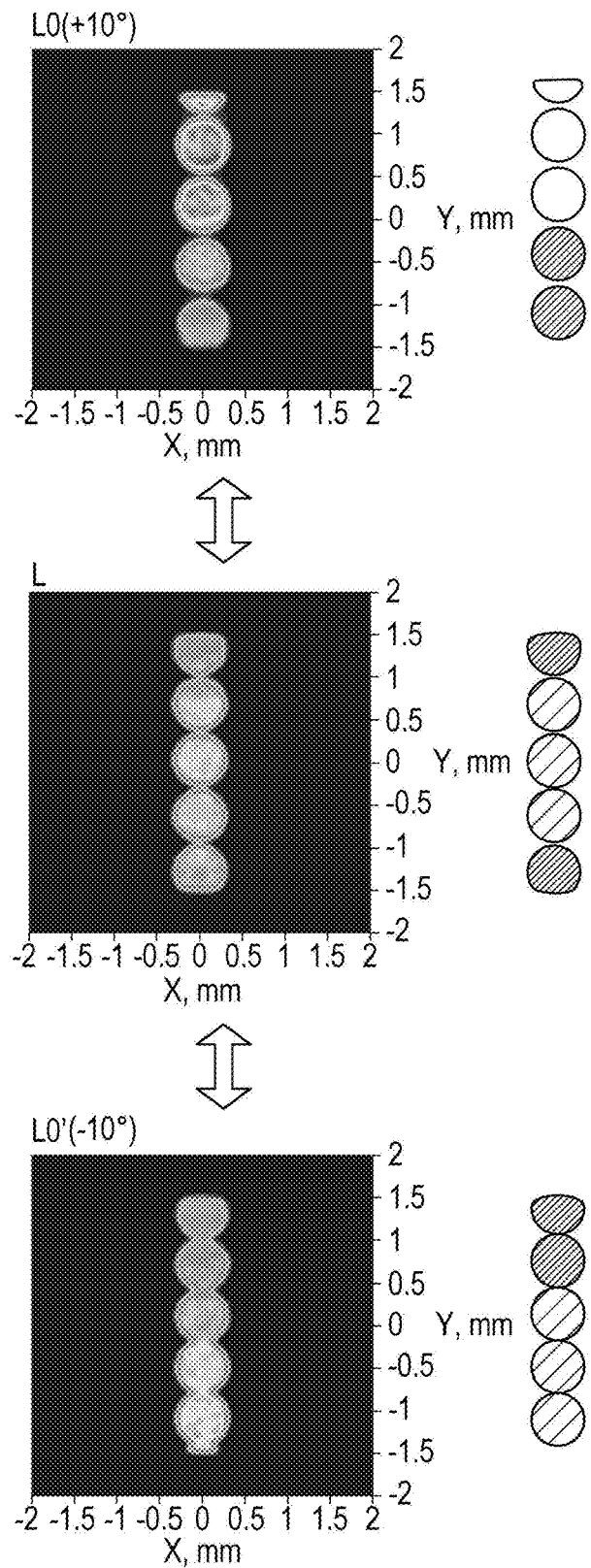
FIG. 14 is an explanatory diagram illustrating results of light ray analysis in a first beam width expander corresponding to a comparative example of the embodiment.
Figure 15:
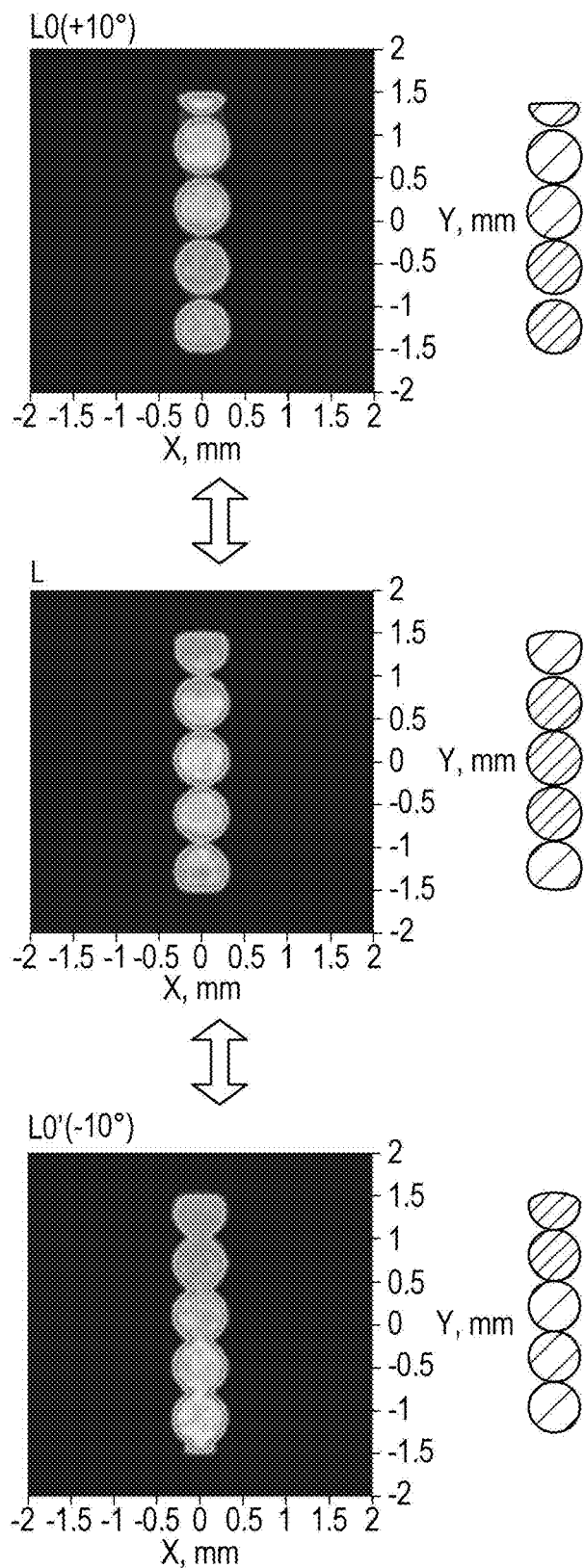
FIG. 15 is an explanatory diagram illustrating results of light ray analysis in a first beam width expander corresponding to Example 1 of the embodiment.

FIG. 14 is an explanatory diagram illustrating results of light ray analysis in a first beam width expander 10A corresponding to a comparative example of the embodiment. FIG. 15 is an explanatory diagram illustrating results of light ray analysis in a first beam width expander 10A corresponding to Example 1 of the embodiment. Note that in FIG. 14 and FIG. 15, the light intensity distribution when the light beam L is incident perpendicularly to the first incident face 16A is illustrated in the middle diagram, the light intensity distribution when incident with the light beam L0 angled +10° with respect to the light beams L is illustrated in the top diagram, and the light intensity distribution when incident with the light beam L0' angled −10° with respect to the light beam L is illustrated in the bottom diagram. Moreover, the intensity is schematically illustrated by diagonal shading and the like at the side of each of the intensity distributions, with regions not appended with diagonal shading indicating maximum intensity, and lower intensities indicated as the pitch of diagonal shading narrows.

In the above description, explanation has been given of a case in which there are four layers of the first light-transmissive layers 12A and three layers of the first partially reflective layers 11A in the first beam width expander 10A; however, there are often cases in which there are nine layers of the first light-transmissive layers 12A and eight layers of the first partially reflective layers 11A in the first beam width expander 10A. To address this, light ray analysis was performed for the first beam width expander 10A having a cutting angle θ illustrated in FIG. 4 of 55° and provided with nine layers of first light-transmissive layers 12A with a thickness of 0.4 mm. In such a case, light rays incident perpendicularly on the first incident face 16A are reflected at the center of the first reflection face 14A. The perpendicular distance from the light source to the first beam width expander 10A is 3 mm.

In the comparative example in which the transmittances of first partially reflective layers 11A of the first beam width expander 10A are all 50%, as illustrated in FIG. 14, although sufficient light reaches the first reflection face 14A in the light beam L0 at an angle of +10°, sufficient light does not reach the first reflection face 13A in the light beam L0' at an angle of −10°. There is accordingly a large difference in intensity between each of the light rays.

In contrast thereto, in the Example 1 in which the transmittances of the first partially reflective layers 11A in the first beam width expander 10A are all 55%, as illustrated in FIG. 15, not only does sufficient light reach the first reflection face 14A in the light beam L0 at an angle of +10°, sufficient light also reaches the first reflection face 13A in the light beam L0 at an angle of −10°. There is accordingly a small difference in intensity between each of the light rays. Thus, employing the first beam width expander 10A according to Example 1 makes uneven brightness not liable to be generated.

Other Embodiments

In the above embodiments explanation has focused on uneven brightness arising in the first beam width expander 10A. However, in the second beam width expander 10B too, uneven brightness can be suppressed in the image vertical direction V corresponding to the second direction Y by employing a similar configuration to that of the first beam width expander 10A, such as by including partially reflective layers having transmittances exceeding 50% in the plural second partially reflective layers 11B.

In the above embodiments, the first direction X corresponds to the horizontal direction H in images, and the second direction Y corresponds to the vertical direction V in images; however, the embodiment may be applied to cases in which the first direction X corresponds to the vertical direction V in images, and the second direction Y corresponds to the horizontal direction H in images.

The above embodiments include two beam width expanders (the first beam width expander 10A and the second beam width expander 10B); however, the embodiment may be applied to cases including only one beam width expander (the first beam width expander 10A).

The entire disclosure of Japanese Patent Application No. 2016-186605, filed Sep. 26, 2016 is expressly incorporated by reference herein.

What is claimed is:

1. A retinal scanning display device comprising:
   a light source that emits a light beam;
   a scanning section that scans the light beam emitted from the light source to form a scanned image;
   a first beam width expander that expands a beam width of the light beam emitted from the scanning section by expanding in a first direction; and
   an optical system that makes the light beam, expanded in beam width by the first beam width expander, incident on an eye of a user;
   the first beam width expander including
      a pair of first reflection faces facing each other along the first direction,
      a plurality of first partially reflective layers disposed between the pair of first reflection faces and stacked along the first direction; and
      a plurality of first light-transmissive layers disposed so as to be interposed between each of the pair of first reflection faces and an adjacent first partially reflective layer of the plurality of first partially reflective layers and interposed between adjacent first partially reflective layers of the plurality of first partially reflective layers;
   the first beam width expander including a first incident face disposed at an end face of the first beam width expander at one side in a first length direction intersecting the first direction, and a first emission face disposed at an end face of the first beam width expander at the other side in the first length direction; and at least one first partially reflective layer from out of the plurality of first partially reflective layers being a partially reflective layer having a transmittance exceeding 50%.

2. The retinal scanning display device of claim 1, wherein each of the plurality of first partially reflective layers has a transmittance exceeding 50%.

3. The retinal scanning display device of claim 2, wherein each of the plurality of first partially reflective layers has a transmittance that is the same as each other.

4. The retinal scanning display device of claim 3, wherein each of the plurality of first partially reflective layers has a transmittance exceeding 50% but not exceeding 60%.

5. The retinal scanning display device of claim 2, wherein the plurality of first partially reflective layers include partially reflective layers having transmittances that are different to each other.

6. The retinal scanning display device of claim 5, wherein the plurality of first partially reflective layers are disposed such that the transmittance gets sequentially higher on progression from the first reflection face positioned on the forward direction side of incident light on the first incident face from out of the pair of first reflection faces toward the other first reflection face from out of the pair of first reflection faces.

7. The retinal scanning display device of claim 5, wherein each of the plurality of first partially reflective layers has a transmittance from 50% to 90%.

8. The retinal scanning display device of claim 1, wherein the first beam width expander has a trapezoid profile in cross-section with inclined faces configured by the first incident face and the first emission face.

9. The retinal scanning display device of claim 1, further comprising:

a second beam width expander that is disposed between the scanning section and the first beam width expander, or disposed between the first beam width expander and the optical system, and that expands the beam width of the light beam in a second direction intersecting the first direction;

the second beam width expander including
a pair of second reflection faces facing each other along the second direction,
a plurality of second partially reflective layers disposed between the pair of second reflection faces and stacked along the second direction, and
a plurality of second light-transmissive layers disposed so as to be interposed between each of the pair of second reflection faces and an adjacent second partially reflective layer of the plurality of second partially reflective layers and interposed between adjacent second partially reflective layers of the plurality of second partially reflective layers; and
the second beam width expander including a second incident face disposed at an end face of the second beam width expander at one side in a second length direction intersecting the second direction, and a second emission face disposed at an end face of the second beam width expander at the other side in the second length direction.

10. The retinal scanning display device of claim 9, wherein at least one second partially reflective layer from out of the plurality of second partially reflective layers is a partially reflective layer having a transmittance exceeding 50%.

11. The retinal scanning display device of claim 10, wherein the second beam width expander has a trapezoid profile in cross-section inclined faces configured by the second incident face and the second emission face.

12. A beam width expander that expands a beam width of an incident light beam by expanding in one direction, the beam width expander comprising:

a pair of first reflection faces facing each other along the one direction, a plurality of partially reflective layers disposed between the pair of reflection faces and stacked along the one direction; and a plurality of light-transmissive layers disposed so as to be interposed between each of the pair of reflection faces and an adjacent partially reflective layer of the plurality of first partially reflective layers and so as to be interposed between adjacent first partially reflective layers of the plurality of first partially reflective layers; wherein a stacked body configured by the pair of reflection faces, the plurality of partially reflective layers, and the plurality of light-transmissive layers includes an incident face disposed at an end face of the stacked body at one side in a length direction intersecting the one direction, and an emission face disposed at an end face of the stacked body at the other side along the length direction; and at least one partially reflective layer from out of the plurality of partially reflective layers is a partially reflective layer having a transmittance exceeding 50%.

13. The beam width expander of claim 12, wherein the stacked body has a trapezoid profile in cross-section with inclined faces configured by the incident face and the emission face.

* * * * *